Aug. 18, 1942.　　　　J. J. SZEPE　　　　2,293,573
GEAR SHIFT FOR MOTOR VEHICLES
Filed June 27, 1938　　　　8 Sheets-Sheet 1
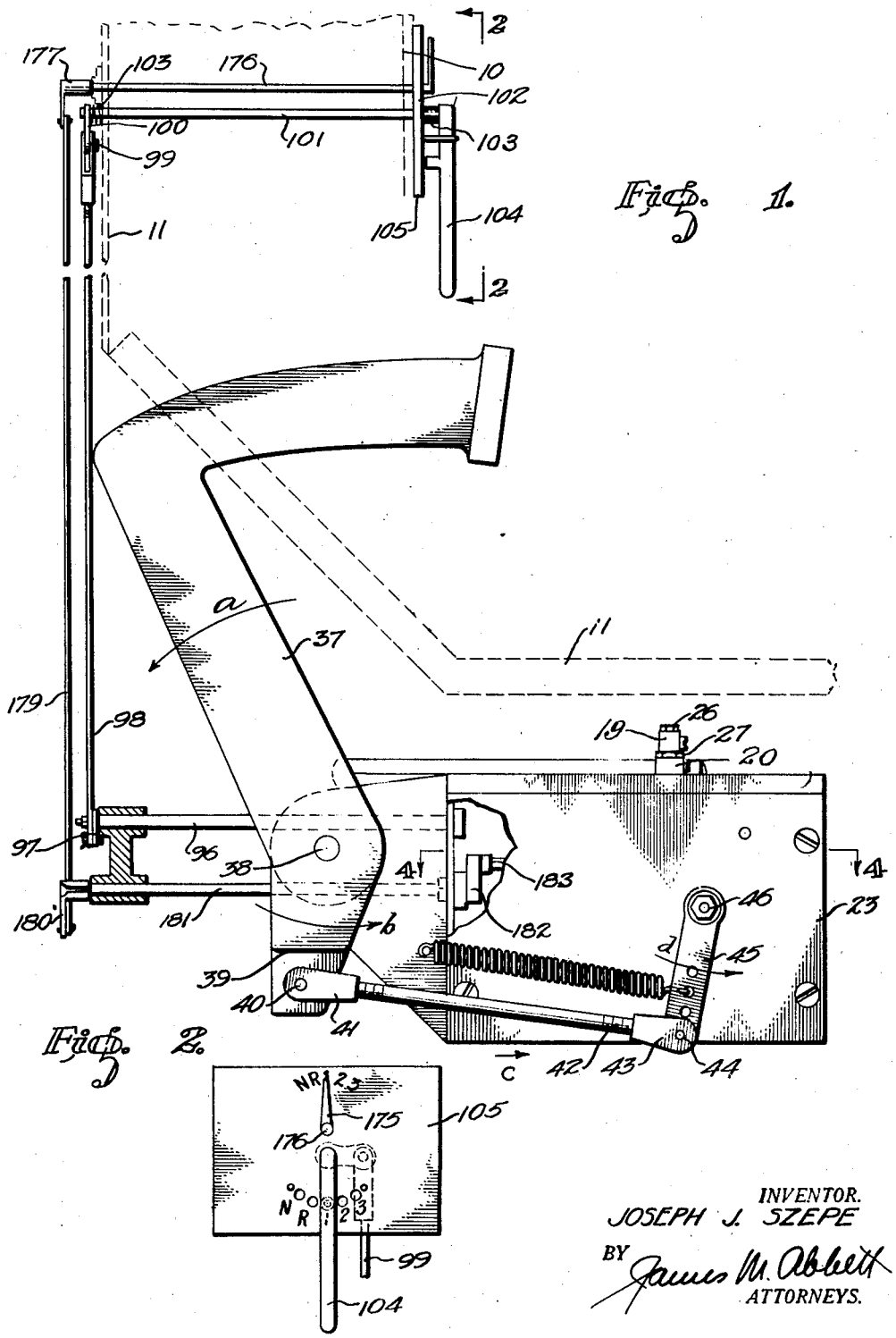
INVENTOR.
JOSEPH J. SZEPE
BY
James M. Abbett
ATTORNEYS.

Aug. 18, 1942.    J. J. SZEPE    2,293,573
GEAR SHIFT FOR MOTOR VEHICLES
Filed June 27, 1938    8 Sheets-Sheet 2

Neutral    Intermediate    High    Reverse    Low

INVENTOR.
JOSEPH J. SZEPE
BY James M. Abbett
ATTORNEYS.

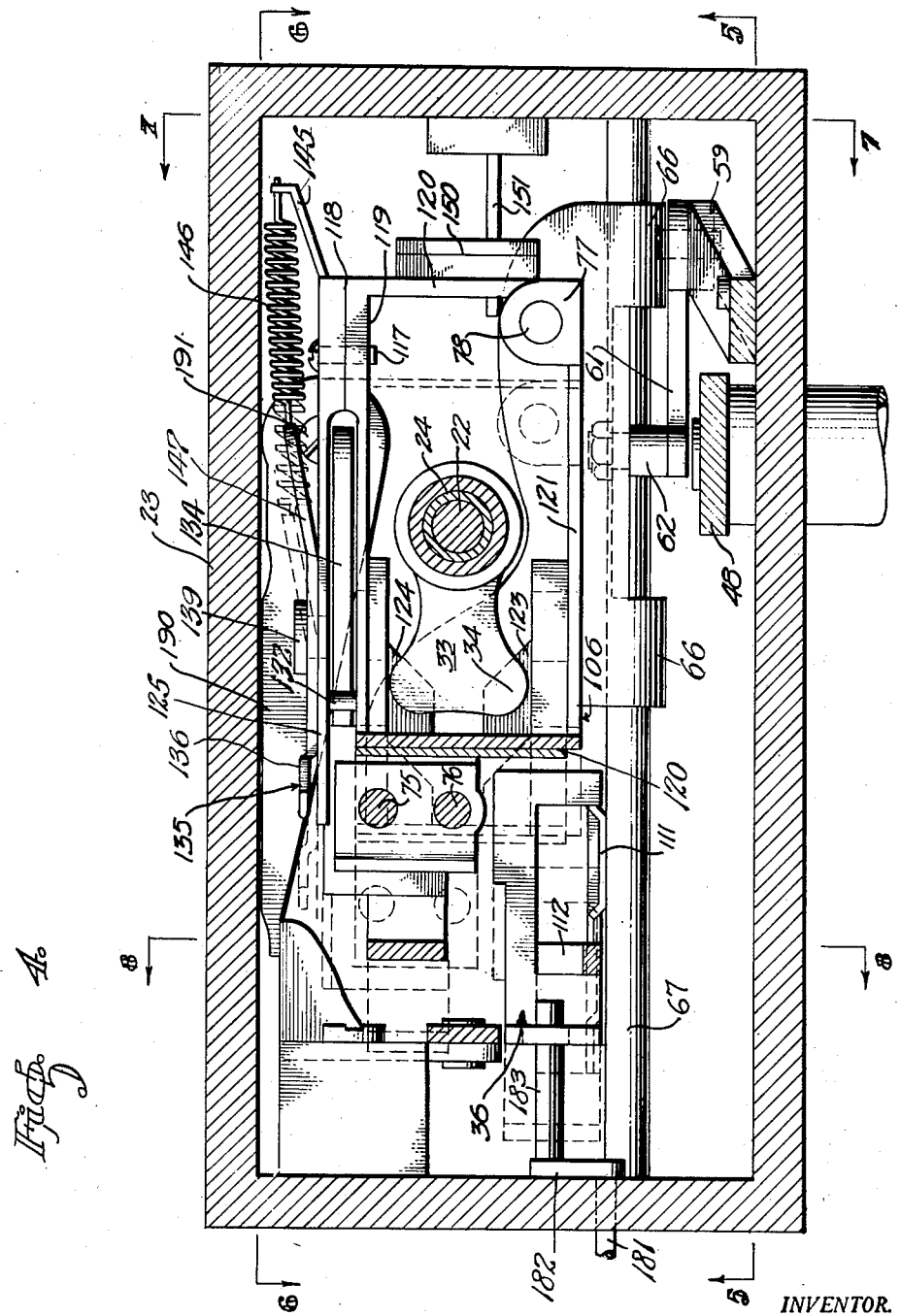

Aug. 18, 1942. J. J. SZEPE 2,293,573
GEAR SHIFT FOR MOTOR VEHICLES
Filed June 27, 1938 8 Sheets-Sheet 4
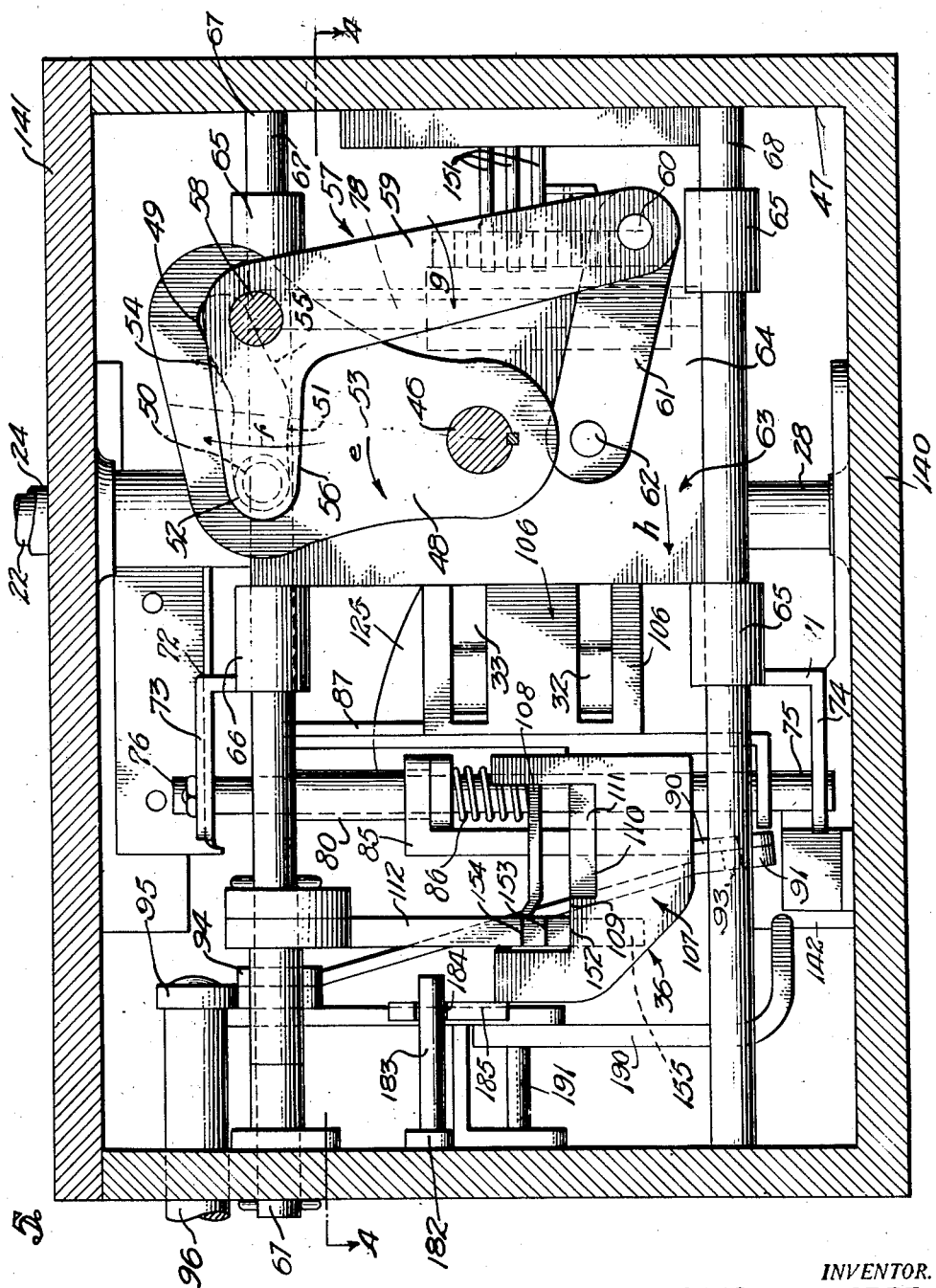
INVENTOR.
JOSEPH J. SZEPE
BY James M. Abbett
ATTORNEYS.

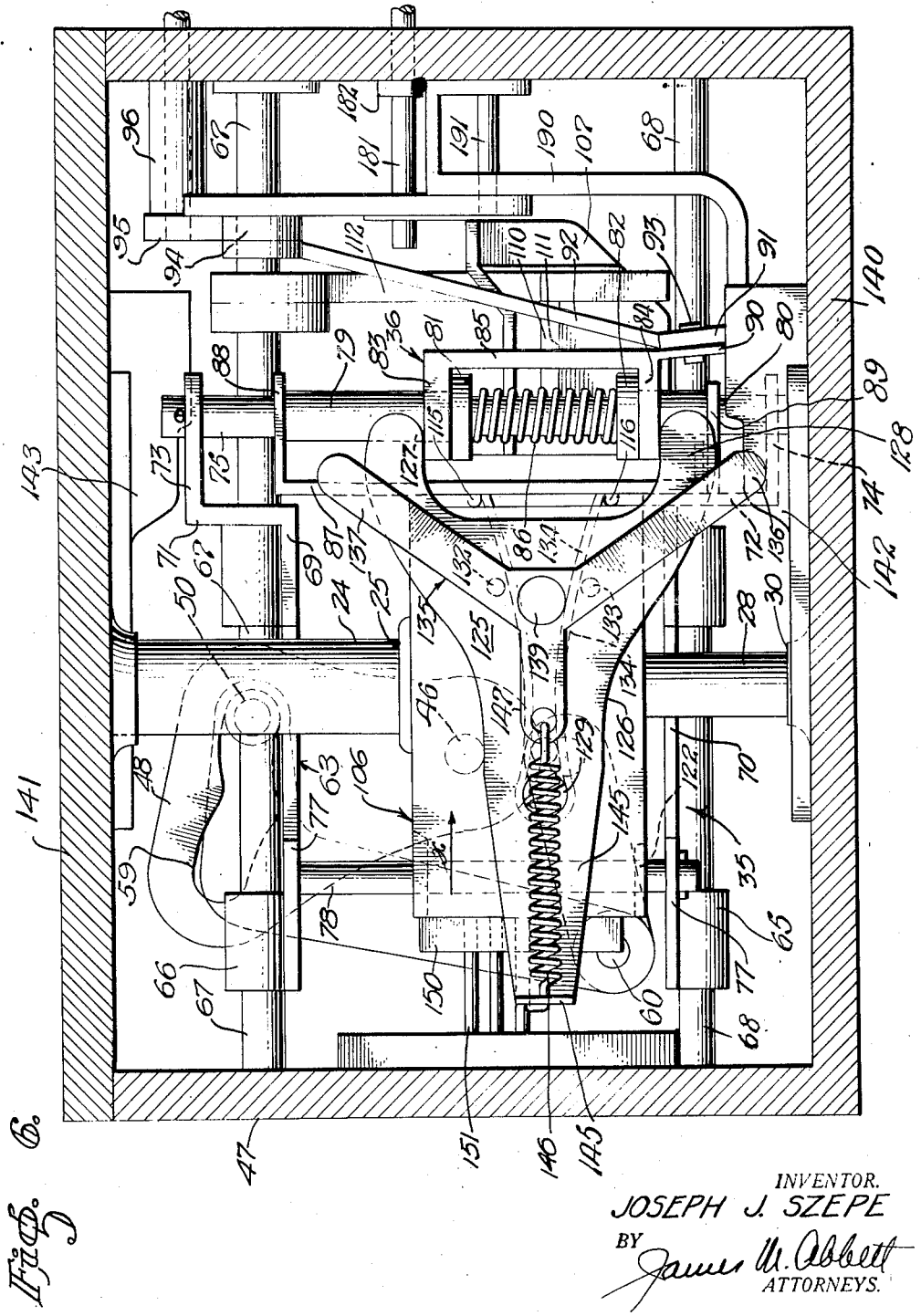

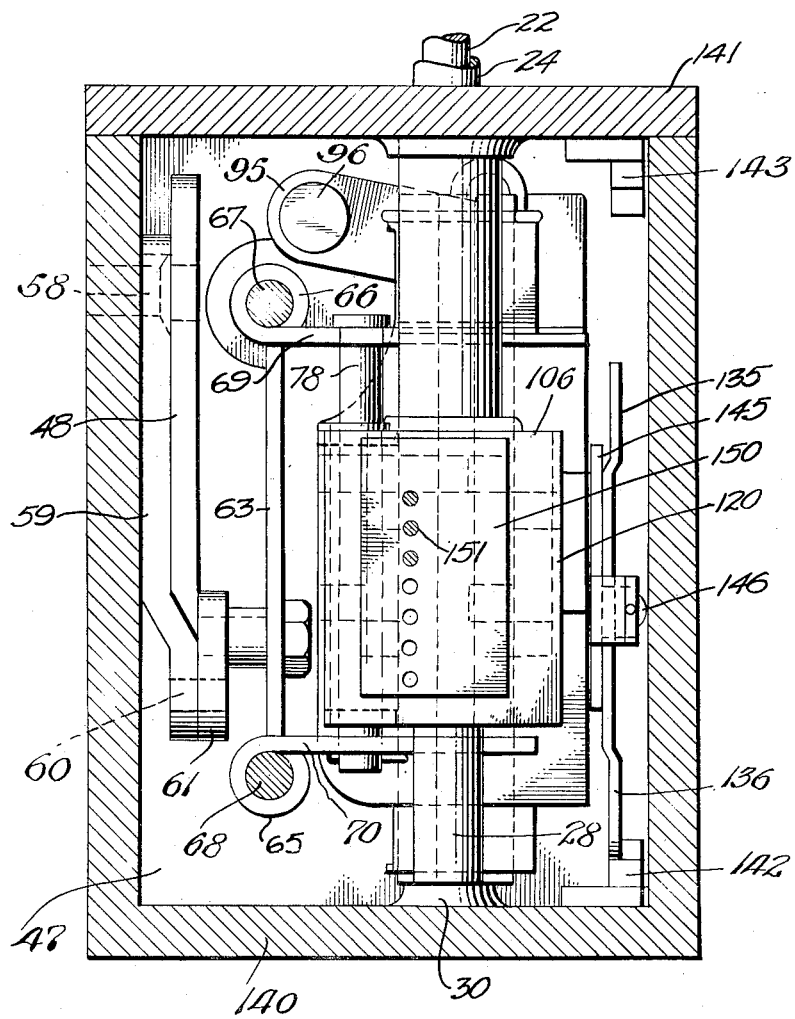

Aug. 18, 1942.  J. J. SZEPE  2,293,573
GEAR SHIFT FOR MOTOR VEHICLES
Filed June 27, 1938  8 Sheets-Sheet 7

INVENTOR.
JOSEPH J. SZEPE
BY James M. Abbott
ATTORNEYS.

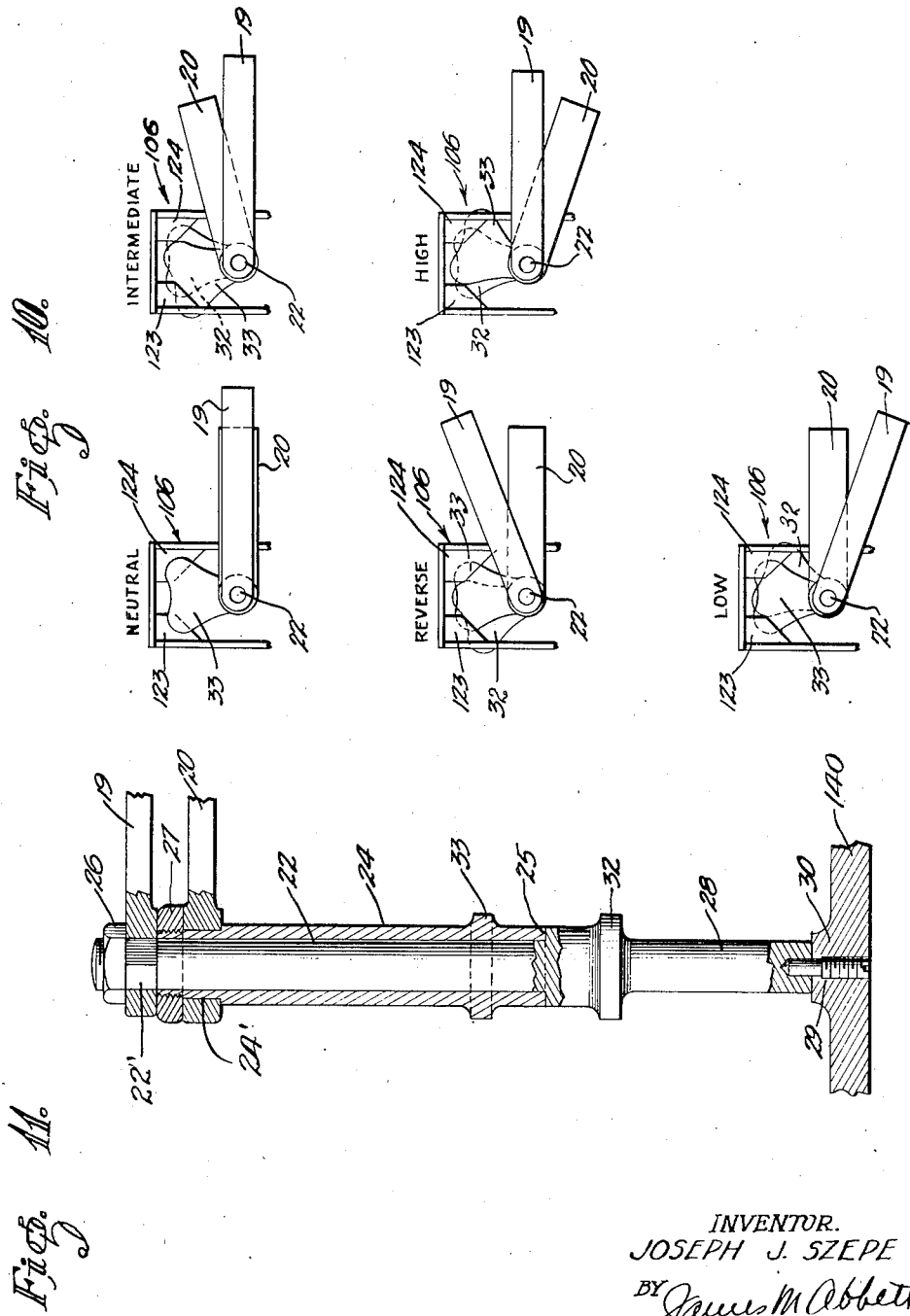

Patented Aug. 18, 1942

2,293,573

UNITED STATES PATENT OFFICE 2,293,573

GEAR SHIFT FOR MOTOR VEHICLES

Joseph J. Szepe, Los Angeles, Calif., assignor to Automatic Gear Shift Corporation, a corporation Application June 27, 1938, Serial No. 216,096

4 Claims. (Cl. 192—3.5)

This invention is for a gear shifting mechanism for motor vehicles, and relates to that type of mechanism in which the shifting is effected automatically through the operation of the clutch pedal without resorting to the use of the gear shift lever now commonly provided, such an invention being shown in U. S. Letters Patent No. 1,906,287, entitled "Gear shift for motor vehicles" and issued to me May 2, 1933.

Various gear shifting devices of this nature have heretofore been devised, but such devices possess various disadvantages. Many of them do not possess the flexibility which is required of a gear shift in the driving of a car. While it is possible to advance from neutral position through the various position speeds to "high" it is not possible with many of them to go from "high" into "second" or from "second" into "first" or for them to automatically shift to a different position such as from "high" to "intermediate" or from "reverse" to "low."

Other such devices are open to the objection that there is no assurance of the gears staying in the position to which they are set after they have once been moved to this position. For instance, in many cars there is a natural tendency for the gears to become disengaged, especially when driving in second gear. Inasmuch as second gear is frequently used in descending steep grades tending to retard the acceleration of the vehicle, it is important that any gear shifting device insure that the gears staying in mesh, and as previously stated many so-called automatic gear shifts which have heretofore been proposed do not prevent the gears from becoming disengaged. Other devices are of extremely complicated construction, or require the use of delicate parts which render their use on a commercial scale impractical.

According to the present invention there is provided a thoroughly practical semi-automatic gear shift wherein the shifting of the gears to any position can be effected in a predetermined manner. The present invention provides a gear shift in which the gears are prevented from becoming disengaged after they have once been brought into mesh until a definite operation is made to release them. The invention is relatively simple, requiring little alteration of the present standard gear shift, and is capable of being built into transmission units of a size convenient for use on present day motor vehicles. The mechanism is positive in its action throughout, is sufficiently rugged to easily outlast the life of the car and can be included in the transmission with very little additional cost to the manufacturer.

In the present invention, as in other mechanical gear shift devices of this nature, the actual shifting of the gears is effected through the operation of the clutch pedal. To this end the clutch pedal is arranged with a lost motion connection to the transmission in such manner that the pedal can be depressed far enough to disengage the clutch without actually effecting a change of the gear setting. When the clutch pedal is pressed beyond a point sufficient to disengage the clutch the gear changing mechanism is brought into operation. The arrangement therefore prevents any changing of the gears while the clutch is engaged. It also allows for the free play of the clutch for driving purposes.

The changing of the gears upon the full depression of the clutch pedal is further dependent upon the action of a selector. The clutch pedal may be partially depressed for idling or can be fully depressed, and if the selector does not change its position upon the full depression of the clutch, no shifting of the gears will be effected, but if the selector moves to a different position upon the full depression of the clutch, shifting of the gears will take place according to the movement of the selector. This arrangement therefore prevents any shifting of the gears when it is not desired to do so even though the clutch pedal may be fully depressed. An escapement mechanism is provided whereby any movement of the selector to high speed is in a step by step progression, and only one shift toward high gear can be effected with each operation of the clutch to the fully depressed position. This arrangement prevents the gears from being shifted in an unnatural progression. The arrangement is such however that an immediate shift may be made from high to any other position on a single actuation of the clutch.

The invention provides means for effecting the movement of the selector. According to the preferred embodiment of the invention this means is under the control of a manually adjustable element which may be conveniently mounted on the steering post or the dash of the vehicle, where it is most accessible to the operator and out of the way of the passengers in the car. Adjustment of the manual control by the operator provides for the movement of the selector to a predetermined station. The structure also provides means for indicating the actual position of the transmission irrespective of the set position of the actuator.

The invention also provides means wherein the change of gearing is effected without clashing or grinding the gears, since there is direct synchronism between the movement of the clutch and the shifting means, thereby constituting a considerable improvement over the present method wherein the gears clash and grind until they mesh. With the present invention the change in the gears can be effected silently and more rapidly than can be accomplished by manual shifting.

The present invention contemplates the provision of an automatic gear shift unit operatively associated with the speed change transmission of an automobile and adapted to be controlled in the sequence of its operation by a selector mechanism and a subsequent series of actuations of the conventional clutch pedal present in the ordinary automobile power unit construction, and also contemplates an automatic shifting from reverse to low or from high to intermediate and return.

The invention is illustrated by way of example in the accompanying drawings, in which:

Figure 1 is a view in side elevation showing the general assembly and application of the present invention to an automobile transmission.

Fig. 2 is a view showing the selector lever and its dial plate.

Fig. 4 is an enlarged view in horizontal section and elevation showing the assembly of the automatic gear shift unit as seen on the line 4—4 of Fig. 5.

Fig. 5 is a view in vertical section through the automatic gear shift section as seen on the line 5—5 of Fig. 4, and particularly discloses the clutch actuated cam element.

Fig. 6 is a view in vertical section through the automatic gear shift unit as seen along the line 6—6 of Fig. 4, and particularly discloses the structure whereby the selector sets the mechanism for a sequence of operation.

Fig. 7 is a view through the automatic gear shift unit as seen on the line 7—7 of Fig. 4 and discloses the parts of a gear shift unit.

Fig. 10 is a collective view in diagram indicating in plan the position of the selector block, the shifting fingers and the gear shift levers corresponding with that shown in Fig. 9.

Fig. 11 is an enlarged view in section and elevation showing the selector fingers, the gear shifting levers and their mounted positions upon their shafts.

Figure 3:
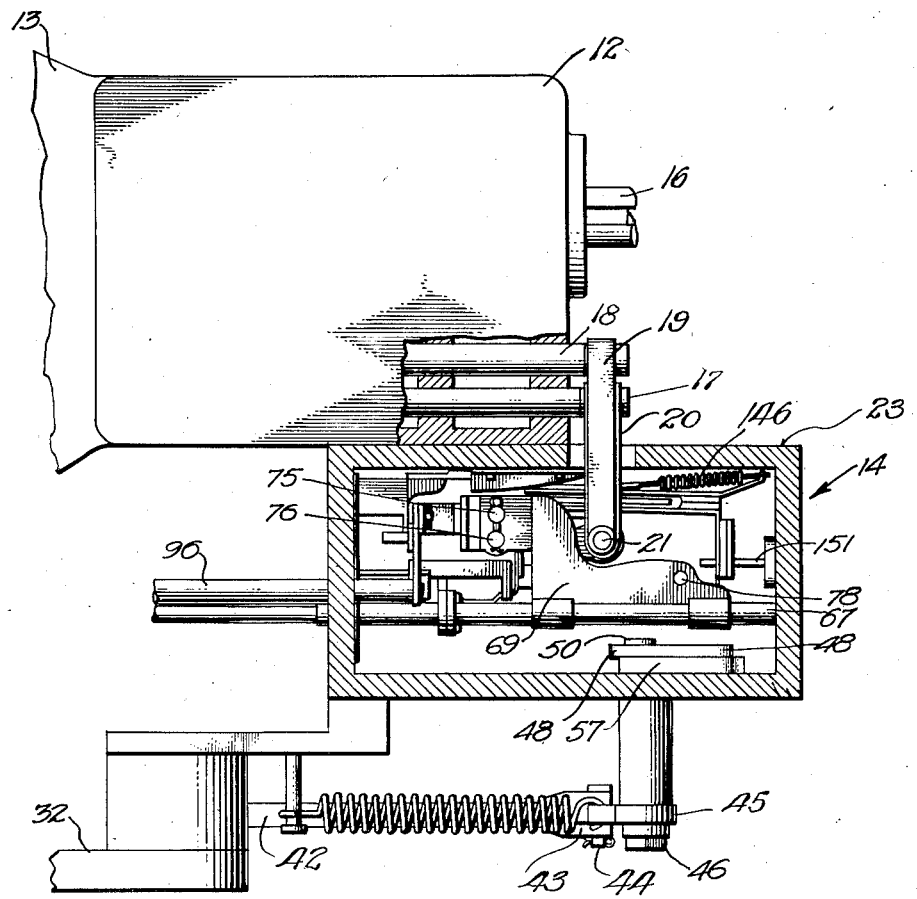
Fig. 3 is an enlarged plan view in section and elevation showing the association between the automatic gear shift unit and the standard speed changing transmission of an automobile.
Figure 9:
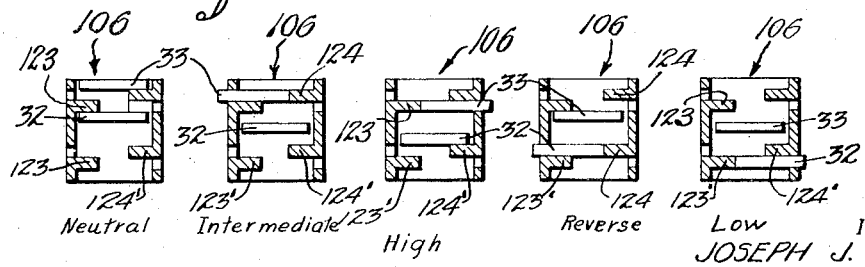
Fig. 9 is a collective view in diagram showing the various positions assumed by the selector block and the selector fingers in shifting the gears to different positions.
Figure 8:
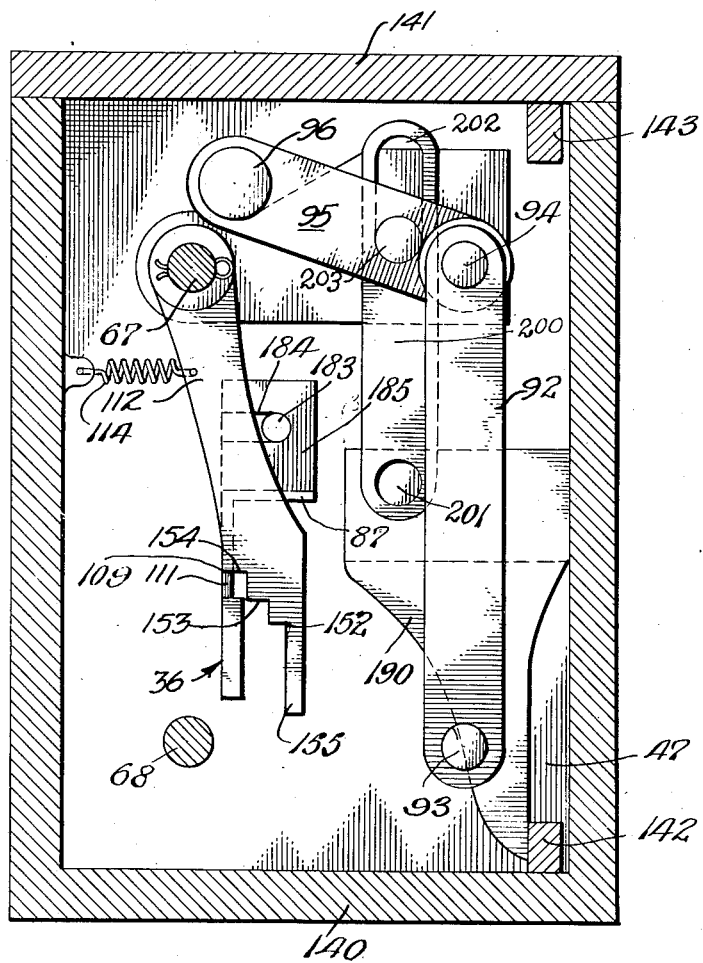
Fig. 8 is a view through the automatic gear shift unit as seen on the line 8—8 of Fig. 4 and disclose the parts of a gear shift unit.

Referring more particularly to the drawings, 10 indicates a dashboard of an automobile, and 11 indicates the floor board. Suitably disposed beneath the floor board is a standard transmission 12, the usual clutch structure 13 and an automatic gear shift unit 14. The clutch structure is suitably driven from an engine (not shown in the drawings). It is to be understood that the engine, the clutch 13 and the transmission 12 are of standard design, such as are used on commercial makes of automobiles, and that the gear set in the transmission 12 is of the type which when shifted will produce various speed and directional driving relationships between the engine and the propeller shaft 16. The transmission is equipped with the usual gear shifting rods 17 and 18 which in the present instance are engaged and actuated by gear shifting levers 19 and 20.

The levers 19 and 20, as shown in the present structure are disposed horizontally and are mounted on a vertical axis 21 defined by a shaft 22 rotatably mounted within the case 23 of the automatic gear shift unit 14, and upon which shaft 22 is separately and freely mounted a sleeve 24. The sleeve 24 is provided as shown in Fig. 11 with a central bore through which the shaft 22 extends and upon which shaft the sleeve is freely rotatable, the lower end of the sleeve rests upon the shoulder 25 of the shaft, the upper end of the sleeve 24 has a squared portion 24' which extends through a corresponding squared opening in the lever 20, extending upwardly from the squared portion of the sleeve 24 is a threaded portion receiving a nut 27 which holds the lever 20 in position, the upper end of the shaft 22 is formed with a squared portion 22', this receives the squared opening of the lever 19, a nut 26 is mounted upon the upper threaded end of the shaft 22 and holds the lever 19 in position, this lever in turn bears against the upper end of the sleeve 24 and cooperates with the shoulder 25 in confining the sleeve 24 for rotation around the shaft 22. The lever 19 is longer than lever 20 as shown in Figure 3 of the drawings and is designed to move the shifting element 17 to place the transmission gears in position for driving in "reverse" or "low." The lever 20 is shorter than the lever 19 and is disposed beneath it as is shown in Figures 3 and 11. The lever 20 is designed to move shifting element 18 and shift the transmission gears into "intermediate" and "high."

The lower end of the vertical shaft 22 is formed with a reduced portion 28 which receives pin 29 extending from a suitable boss 30 of the bottom 47 of the case 23. At a point intermediate the upper and lower portions of the vertical shaft 22 a selector finger 32 is formed or secured. It may be found preferable to weld this finger in position. The sleeve 24 also carries a selector finger indicated at 33. By reference to Fig. 4 of the drawings, it will be seen that in their normal positions these fingers are superimposed one above the other and extend horizontally. The outer free ends of each of the fingers are formed with oppositely projecting semi-circular cam surfaces 34, a pair of which are formed on each of said fingers and which projecting portions fit between sets of lugs to be hereinafter described.

The fundamental structure of the automatic gear shift unit is a carriage unit which moves lengthwise of the case 23 and generally indicated at 106 in the drawings, and a selector unit 36 which is carried by the carriage and moves transversely thereof to dispose the apparatus in a relationship which will prepare the automatic gear shift unit for a desired shifting action. The details of the carriage unit 106 and the selector unit 36 will be described hereinafter more particularly.

Generally considered, the carriage unit is actuated by movement of the conventional clutch pedal 37 which is mounted upon a vehicle and may be thrown in and out to actuate the clutch 13. This pedal is mounted upon a shaft 38 and carries an extending lever portion 39 at the free end of which a pin 40 is disposed. This pin receives a shackle element 41 which is internally threaded to receive a draw-bar 42. The draw-bar extends rearwardly of the shaft 38 and longitudinally of the vehicle and in fact extends parallel to the side of the automatic gear shift case 23. A threaded shackle 43 is mounted upon the rear end of the draw-bar 42 and is pivoted by a pin 44 to a lever arm 45. This lever arm swings in a vertical plane and is fastened onto a rock shaft 46 which is rotatably supported in a suitable bearing and extends through a side wall 47 of the automatic gear shift case 23. Fastened onto the innermost end of the shaft 46 and swinging therewith is a rock cam 48 which is formed with a cam opening 49 therein to receive a cam roller 50 (see Fig. 5). The width of the cam opening agrees substantially with the width of the roller. The cam surfaces are parallel and the initial surfaces indicated at 51 and 52 are arcuate and are concentric with the axis of the rock shaft 46. This concentric surface terminates substantially along the dotted line 53 indicated in Fig. 5 of the drawings and parallel cam surfaces 54 and 55 then continue eccentric to the rotating axis whereby the roller 50 will be moved away from the rotating axis of the shaft 46. The roller 50 is mounted upon the free end of an arm 56 of a bell crank 57. The bell crank is pivoted upon a shaft 58 carried by the side wall 47 of the case 23. The arm 56 of the bell crank extends substantially horizontally and the bell crank lies in a vertical plane. The crank is formed with a downwardly projecting arm 59 which is here shown as of greater length than the arm 56 and carries a pin 60 at its free end. This pin engages a link 61 which extends in vertical plane toward the forward end of the case 23 and is pivotally mounted upon a pin 62. The pin 62 is carried by the cross-head 63 of the carriage unit 106. This cross-head comprises a vertically disposed body plate 64 which is formed at its opposite ends with sets of bosses 65 and 66. These bosses receive horizontally parallel guide rods 67 and 68 which lie in a common vertical plane, the plane being parallel to the side wall 47 of the case 23 and spaced therefrom.

Extending at right angles to the body plate 64 are parallel side plates 69 and 70. Formed at the same end of each of the side members 69 and 70 are flanges 71 and 72, respectively, which are bent outwardly and oppositely from each other and at right angles to the members 69 and 70. These flanges terminate in bearing elements 73 and 74, respectively, which project outwardly and are parallel to each other and the side members 69 and 70. These bearing elements are each formed with two openings to receive parallel guide shafts 75 and 76. The guide shafts are thus fixed on the cross-head structure 63 and are disposed at right angles to the guide shafts 67 and 68. The side plates 69 and 70 are also formed with bosses 77 which receive a cross shaft 78.

By reference to Fig. 6 of the drawings, it will be seen that the shafts 75 and 76 slidably support a pair of bushings 79 and 80, which are formed with enlarged head portions 81 and 82, respectively, and the cylindrical bodies of which bushings extend oppositely through the parallel ears 83 and 84 of a yoke 85. The two bushings are counter-bored and are fitted with a compression spring 86, which acts to force the two bushings oppositely on the shaft for a purpose to be hereinafter set forth.

A selector escapement yoke 87 is also slidably mounted upon the shafts 75 and 76 and is formed with a pair of ears 88 and 89 through which the shafts 75 and 76 extend and against which the outer end faces of the bushings 79 and 80 normally bear. The yoke 85 is formed with an ear 90 which is engaged by a connecting link 91. This link is pivotally attached to a selector rod 92 by a pin 93. The opposite end of this rod is connected by a pin 94 to a swinging arm 95 which in turn is fastened upon the inner end of a shaft 96. The shaft 96 is rotatably supported in a boss carried by the forward end wall of the case 23. The shaft 96 is fitted at its forward end with a crank arm 97. This crank arm is connected by a draw-bar 98 with a pin 99 carried upon a crank arm 100. The crank arm 100 is fixed to the end of a selector shaft 101 which is rotatably supported in bearings carried by the dash-board 10 of the automobile. This shaft projects through the instrument board 102 and is yieldably held in position by a spring 103. The outer end of the shaft 101 is fitted with a selector lever 104 which may swing over holes 105 in instrument board 102. The lever may be set at various positions and reading from left to right with reference to Fig. 2 of the drawings the possible setting positions of the lever are "neutral," "reverse," "low," "intermediate" and "high." The details of the function of this lever will be hereinafter set forth.

It is to be understood that the portions 73 and 74 of the cross-head 63 are offset from the edges of the side members 69 and 70 in a direction away from the body portion 64 of the cross-head. This provides clearance for certain purposes to be hereinafter described. Among these purposes is to accommodate the selector escapement yoke 87 and a selector block 106.

The escapement yoke is formed with an outwardly extending portion 107 at a point intermediate the ears 88 and 89, and which portion carries a pair of laterally extending sections 108 and 109. These sections are spaced parallel to each other and project in an outward direction and away from the cross-head 63. The lowermost extension here designated as 109 is formed with a recess 110 and a stop shoulder 111. The stop shoulder 111 is provided to cooperate with shoulders upon an escapement pawl 112, which is mounted to swing freely on a guide rod 67 and will cooperate with the escapement yoke 87 to hold the selector block 106 in a set position as the device functions. A spring 114 is interposed between the escapement pawl and side wall to yieldably resist longitudinal movement of the pawl 112 and to frictionally hold the pawl in any position to which it has been moved.

The selector escapement yoke also carries a pair of lugs 115 and 116 which are spaced from each other and which project from the back of the yoke for a purpose to be hereinafter described. Mounted upon the shaft 78 carried in ears 77 of the cross-head is the selector block 106. The selector block 106 includes a plate 119. The plate extends parallel to the side wall of the case and is formed with an end portion 120 and a parallel portion 121 spaced in parallel relation to the portion 119. The plates 119 and 121 carry pairs of cam lugs, a pair 123 and 123' being carried on plate 119, and a pair 124 and 124' being carried on the plate 121. These lugs are spaced from each other and receive the curved ends 34 of the selector fingers 32 and 33.

Mounted upon the block by a bolt 117 is a selector fork structure 125. This structure has a central portion 126 and a widened end forming a pair of spaced fingers 127 and 128. The selector fork 125 lies parallel to the face 119 of the selector block 106 and overhangs the same at its forward end. The fingers 127 and 128 of the fork span the flange portions 83 and 84 of the yoke 85 and engage the collars on bushings 81 and 82 so that when the yoke 85 is moved transversely of the cross-head 63 the fork 125 will swing on its axis as defined by the pin 117.

Mounted upon the plate 119 of the selector block 106 and along the longitudinal center line thereof is a pin 129. The fork 125 carries a pair of tangs 132 and 133 which are spaced at opposite sides of the longitudinal center of the fork. Disposed between the tangs and positioned around the pin 129 is a hairpin spring 134. The legs of this spring are flexed to seat between the tangs 132 and 133 and their outer free ends seat between the lugs 115 and 116, which lugs are formed as a part of the selector escapement yoke 87. The lugs 115 and 116 project from the transverse element of the escapement yoke and provide opposing shoulders between which the outer ends of the spring 134 may seat and by which one leg of the spring 134 may be flexed as the yoke shifts. This tends to hold the selector fork 125 in its centrally aligned position and when the selector escapement yoke 87 is shifted in either direction a leg of the spring 134 will be flexed correspondingly.

An important feature of the present invention is the automatic operation to return the gear set from "reverse" to "low" in one automatic movement and from "high" to "intermediate" in another automatic movement. This is accomplished by a shifting lever 135 which comprises a pair of angularly disposed arms 136 and 137, which extend oppositely from the longitudinal center of the shifting lever and in their assembled relation oppositely from the longitudinal center of the selected block 106.

At the center of the lever structure 135 is an opening which receives a pin 139 projecting from the face of the selector fork 125. This pin pivotally supports the shifting lever 135 in a plane parallel to the face of the shifting fork 125, and due to the length and angularity of the arms 136 and 137 of the shifting lever 135 the levers completely overhang the carriage structure and terminate adjacent to the walls 140 and 141 of the case 23 when the carriage structure moves to either of its extreme positions. By reference to Figure 6 it will be seen that the lever arm 136 overhangs the end of the carriage structure and will encounter the member 142 after an advanced stroke and upon retroactive. The same condition would arise when the lever 137 moves to its extreme position and encounters the member 143 carried upon the wall 141. Attention is directed to the fact that the radial length of each of the arms 136 and 137 is equal and that it is greater than the normal distance between the axis of pin 139 and the inner faces of walls 140 and 141 when the selector block is in either its "reverse" position or its "high" position.

The selector fork is formed with an extension 145 to which one end of a centering spring 146 is secured. The opposite end of the centering spring is attached to a finger 147 formed as a part of the shifting lever 135. Thus, the shifting lever 135 will normally be maintained in its central and neutral position. The selector block 106 is slidably mounted upon the cross-head structure 63 of the carriage assembly. The side portions 122 of this block are formed with an opening 148, which opening receives the shaft 78. The shaft 78 is also mounted within the openings through the side members 69 and 70 of the cross-head 63; thus, the selector block 106 is mounted to move transversely of the cross-head while carried thereby and is also mounted to move transversely of the longitudinal path of travel of the cross-head upon the guide rods 67 and 68. The selector block 106 will also travel longitudinally with the cross-head 63 and in so doing will bring the inclined faces of a selected one of the cams 123, 123', 124 or 124' into alignment with a portion 34 of one of the selector fingers 32 or 33. This will cause the engaged finger to swing upon the vertical axis 21 of the vertical shaft 22 and sleeve 24 and will thus appropriately shift the gears in the transmission case 12.

It is understood that normally the selector block 106 stands so that both sets of lugs are out of alignment with the selector fingers 32 and 33, this being a neutral position.

It is to be understood that when the clutch is actuated through its lever 37 the cross-head 63 will be reciprocated longitudinally of the case 23 for each actuation of the clutch lever 37. The shifting movement of the cross-head is in the direction of the angularity of the lever arms 136 and 137 of the shift lever 135 as the cross-head is restored to its normal locked position.

Disposed adjacent to the side walls 140 and 141 are lugs 142 and 143, one of which will be encountered by the shifting arm 136 and the other by the shifting arm 137 when that particular arm is in its extreme laterally moved position. The lugs 142 and 143 are so disposed as to be thus encountered before the end of the return stroke of the cross-head 63 to its locked position, and thus, as the carriage moves from its locked position the end of the shifting arm 136 or 137 which has engaged its lug 141 or 143, will be held against further travel, and will thus provide a fulcrum which will transmit a force to the selector block tending to shift it laterally.

Thus, when the gears of the transmission are in "reverse" an actuation of the clutch lever will automatically throw the gears out of "reverse" and into "neutral" or when the gears of the transmission are in "high" an actuation of the clutch lever will automatically shift the gears back to intermediate without any further attention upon the part of the driver or any manipulation of the selector handle 104 on the dashboard.

In operation of the present invention a structure is assembled as shown in the drawings and properly installed within an automobile and in association with the transmission 12, the clutch 13 and the dashboard 10. When the car is started the selector handle 104 is in a "neutral" position. At such a time the yoke 85 is held in equilibrium by the selector fork 125, the coil spring 86 and the hairpin spring 134. If it is then desired to progressively shift the gears into "high" the selector handle 104 is swung over the dial plate 105 until it registers with the "high" position. This in turn rotates the shaft 101, the levers 100 and 97, and then rotates the shaft 96. The shaft 96 rotates the lever 95 and draws the rod 92 and the link 91 so that the yoke 85 to which the link connects at 90 will shift the yoke 85 against the tension of the spring 86 as the bushing 79 or 80 is shifted on the shaft 75 or 76.

It is to be understood that at this time the selector block is locked against shifting movement since it is formed with a lock plate 150 which is formed with a plurality of perforations to receive lock pins 151 extending longitudinally of the case 23 and projecting from the end wall thereof. These pins are of such a length as to insure that when the carriage cross-head 63 moves longitudinally and away from them the selector block 106 will be released so that the selector block will be restored to a position of alignment with the yoke 85, as will be hereinafter described.

As shown in Fig. 7 of the drawings the lock plate 150 is formed with a plurality of apertures to receive the pins 151, there being a greater number of apertures than pins, so that as the selector block moves from position to position the set of pins will register with a corresponding number of openings to the set and will hold the selector block against the movement while the cross-head 63 of the carriage structure is in its set position.

After the selector handle 104 and the mechanism connected therewith has been set, such for example to finally place the transmission gear in "high," the clutch pedal 37 is depressed, this swings the pedal in the direction of the arrow a, as shown in Fig. 1, which in turn swings the lever arm 39 in the direction of the arrow b. The bar 42 will then be moved in the direction of the arrow c and will swing the lever 45 in the direction of the arrow d. As this takes place the rock cam 48 will swing with the shaft 46 and in the direction of the arrow e shown in Fig. 5 of the drawings. The cam groove 49 will then move along the roller 50 and when the roller 50 encounters the eccentric faces 54 and 55 of the groove the arm 56 of the bell crank 57 will swing in the direction of the arrow f and will cause the bell crank arm 59 to swing in the direction of the arrow G. The bell crank arm 59 will then act through the link 61 to shift the cross-head 63 in the direction of the arrow h. Thus, the cross-head will slide on the guide rod 67 and 68 within the case. Carried by the cross-head is the selector escapement yoke 87 and the selector block 106. These elements have been held in their locked positions with the selector fork 125 being maintained normally in its central aligned position upon the block and with relation to the yoke 87 by reason of the co-action between the spring 134 and the tangs 132 and 133. When, however, the previously described sequence of action takes place by depressing the clutch pedal 37 and the yoke 85 has shifted to a selected position the selector fork structure will be turned on its axis and the spring 86 will be compressed while the leg of spring 134 in the direction of movement will be flexed. It will be seen that when the yoke 85 is positively moved to a set position by the member 92 the fork 125 will be oscillated in the direction of movement since the fork engages and spans the parallel ears 83 and 84 of the yoke. This shifting movement of the yoke in either direction will be resisted yieldably by the spring 86 which is interposed between the heads 81 and 82 of the bushings 79 and 80, thus when the yoke moves in the direction of the bushing 79 it will carry with it the bushing 80 while compressing the spring in the direction of movement. If the yoke moved in a counter direction it would carry with it the bushing 79. When, however, the yoke is released by disengagement from the pins 151 various springs will restore equilibrium of the parts and place the yoke in position so that the two bushings will be held as shown in Figure 6. The withdrawal of the lock plate 150 from a meshed position with relation to the pins 151 when the carriage 35 moves will release the selector block 106 so that it may respond to the urge of the spring 86 and the flexed leg of spring 134 and shift the selector block to a position where a corresponding shifting of the transmission unit will take place and the selector fork 125 will be restored to its original position of alignment, as shown in Fig. 6. If it were not for the fact that the selector escapement yoke is fitted with the stop shoulders 109 and 111 to be engaged by the pawl 112 the selector escapement yoke would instantly move to its extreme set position but this cannot take place due to the fact that the pawl 112 which is mounted on the guide shaft 67 is fitted with a series of stops 152 and 153. The stop 152 may be brought into engagement with the face 109 to set the structure for "reverse" and the stops 152 may also be brought into engagement with the shoulder 111 to set the structure for "low" gear. The stop 153 when brought into engagement with the shoulder 111 sets the structure for "intermediate" gear and when the stop 111 rides over the face 154 of the pawl 112 the structure is in "high" gear. Thus, with the protruding end 155 of the pawl 112 at all times extending between the members 108 and 109 each shifting movement of the cross-head 63 of the carriage and the selector escapement yoke 87 will act to progressively dispose the shoulders 152, 153 and the face 154 in relation to the shoulders 109 and 111 to permit an escapement of the selector escapement yoke which will consecutively shift the selector block. As the selector block shifts while supported upon the shaft 78 and as induced by the action of the selector fork 125 and the expansion spring 86 and the spring 134 the selector block will be moved to a position where one of its lugs 123, 123', 124 or 124' will stand with its inclined face in the plane of one of the circular edges of a finger 32 or 33, and as the carriage and the selector block return to their original normal locked position the inclined face of the particular lug will contact with the rounded corner of the particular finger and will swing the finger 32 or 33 upon the axis of the shaft 22. This will in turn swing the engaged finger 32 or 33, and since these fingers are fastened on the shaft 22 and the sleeve 24 respectively, the shifting lever 19 or 20 will be rotated and will shift the member 17 or 18 which is in engagement therewith to produce an appropriate shifting of the gears within the transmission unit 12. By this arrangement it will be seen that the setting of the selector handle 104 is made to select the final position of the transmission in a sequence of operations, thus if the selector handle 104 is set at "intermediate" when the device is in an initial position of "neutral" the structure will operate automatically to set the transmission in "low" gear and "intermediate" gear, but will not automatically set the transmission in "high." If the selector handle 104 is set for "high" the sequence of automatic operation will pass through "low," "intermediate" and "high." On the other hand if the selector handle is set for "reverse," the gear change will be made to bring about a reversed driving direction.

The principal feature of the present invention is the automatic action of the speed-changing structure when the carriage and kindred parts stand as set in "reverse" or "high" for under these circumstances an actuation of the clutch pedal 37 when the structure is in "reverse" will automatically throw the transmission into "low" and a successive operation will automatically throw the transmission back into "reverse." The value of this automatic alternate shifting when parking a car at a curb can well be appreciated. The structure also acts when the mechanism is set in "high" to shift the transmission back to intermediate when the clutch pedal 37 is actuated and on a second actuation will shift the transmission back to "high." Thus, in traffic where high power is not required the vehicle may be driven up to a traffic stop and the clutch actuated. This will automatically shift the transmission into "intermediate" and due to the concentric faces 51 of the cam arrangement disclosed in the cam 48 the clutch pedal may be held in an intermediate position to allow idling of the engine without producing any shifting movement, thus it is possible to partially depress the clutch pedal 37 and idle the engine when any set condition of gearing prevails, after which a complete depression of the clutch pedal will act to move the bell crank 57 and thus shift the cross-head 63 of the carriage structure.

The mechanism for producing the automatic shift from "reverse" to "low" and return, and from "high" to "intermediate" and return, is particularly concerned with the shifting lever 135 and its arms 136 and 137. It has been explained that when the selector handle 104 is in one extreme position the apparatus is set for "neutral" and that when it is in its other extreme position the apparatus is set for "high." When in either of these positions one arm of the shifting lever 135 is in an extreme position at the adjacent sidewall 140 or 141 of the case 23.

Assuming that the selector escapement yoke 87 is in its "neutral" position, as shown in Fig. 6 of the drawings, it will be seen that the lug or pin 142 is disposed in the path of the tip of the lever arm 136 and is positioned as to insure that the lever arm 136 will not ride over and around the pin or lug 142 in a shifting movement of the carriage. When, however, the escapement yoke 87 is set over one position from "neutral" to "reverse" there will be a sufficient relationship between the position of the lug 142 and the lever arm 136 of the shifting lever 135 to cause the tip of the lever arm 136 to pass around the lug 142 when the cross-head structure moves in the direction of the arrow x in Fig. 6, and to be lodged against this lug as the cross-head moves from its normal position. This will make it necessary for the fulcrum point of the shifting lever 135 to move laterally, thus shifting the yoke 85 and swinging the selector fork 125 to a position corresponding with "low." Upon the next retraction of the cross-head 63 and the carriage the member 150 will be disengaged from the pins 151 and the spring action of springs 134 and the compression of the spring 86 will automatically shift the selector escapement yoke 87 to its "low" position, so that when the carriage is retracted the appropriate shifting lug will engage the appropriate finger 32 or 33 and shift the gears into "low." This will move the carriage so that on the next actuation of the clutch the shifting lever 135, which has been restored to its normal position by the spring 146, will clear the lug 142 and will thus permit the escapement yoke 87 to return to its "reverse" position, in which position it has been set by the yoke 85.

It is obvious that with this arrangement it would be necessary to permit the gear-shift to be moved from "reverse" to "low" before it could be set to move the gear-shift into "intermediate" before it had been set in "reverse" unless some other means is provided for bringing about this action. In order to obviate this objection the lug 142 is preferably carried on a lever arm 190. This is mounted upon a pivot pin 191 in the case 23, and when it is desired to move the shifting mechanism from "reverse" to "neutral" the setting of the selector handle 104 in "neutral" position will act to cause the lever 190 to swing to a position where the arm of the shifting lever 135 will clear the lug 142 and thus make it possible for any desired shifting of the selector mechanism to be made without reference to the automatic feature which had been provided to alternately shift the set from "reverse" to "low" and back to "reverse" when the selector handle had been set for "reverse." A link 200 limits movement of lever 95, since it is connected to a pin 201 and its opposite end is formed with an elongated slot 202 at its upper end, which receives a pin 203 carried by the lever 95.

In the operation of the gear-shift structure the selector handle 104 may be set for "high" but this will not give any indication of the exact setting of the gear shift structure at a particular time. The exact setting is indicated by a pointer 175 which is mounted upon a shaft 176 and swings across the face of the dial 105 or a dial positioned at some other desirable point upon the dash-board for convenient observation. The pointer 175 is actuated by a shaft 176 which extends through the dash-board and carries a lever 177 at its rear end. This lever may be actuated by a flexible wire structure of convenient design or by a rod 179 pivoted thereto and attached to a lever 180. The lever 180 is mounted on the end of a shaft 181 which extends into the end of the case 23 and carries a lever 182. The lever 182 is fitted with a pin 183 which extends into a slot 184 formed in an extension 185 carried upon the selector yoke 87 and which will act in its various set positions to swing the lever 182 and thus directly indicate the position of the selector yoke irrespective of the set position of the selector handle.

It will be obvious that alternate shifting from "high" to "low" is accomplished in the same way at the opposite end of the path of travel of the escapement yoke 87 and when the lever arm 137 of the shifting lever 135 engages the pin or lug 143.

It will thus be seen that by the use of the structure here disclosed it is possible to conveniently assemble and associate an automatic gear shifting device in operative relation to the usual speed-change transmission of an automobile and that not only will the structure operate automatically to set the transmission progressively in different gear ratios but will act automatically without setting to shift from "high" to "intermediate" and return, and from "reverse" to "low" and return, without requiring any attention on the part of the operator.

While I have shown the preferred form of my invention, as now known to me, it will be understood that various changes might be made in the combination, construction and arrangement of parts, by those skilled in the art, without departing from the spirit of the invention as claimed.

Having thus described my invention, what I claim and desire to secure by Letters Patent is:

1. In combination with a driving member, a driven member, a variable speed gear transmission and a clutch, a speed selecting and changing mechanism operatively associated with the transmission and the clutch and comprising a casing, a shifting carriage reciprocating therein, means operatively associating said carriage with a clutch pedal whereby the carriage will move back and forth as the clutch is moved in and out, a selector mechanism mounted upon the carriage, means carried by the housing and establishing an operative relationship between the transmission and the selector mechanism whereby when the selector mechanism is in certain set positions it will place the gears of the transmission in neutral, reverse, low, intermediate and high positions, a selector actuating the selector mechanism whereby as the shifting mechanism is moved by the clutch pedal it will affect the transmission operating means to place the transmission in a selected position, means acting to automatically progress the positions of the transmission from an initial position to a set position, and means associated with said shifting means whereby a subsequent movement of the shifting means after the transmission has moved to a finally set position will act to automatically shift the selector means and thereafter move the transmission to a previously set position.

2. In combination with a driving member, a driven member, a variable speed gear transmission having neutral, reverse, low, intermediate and high positions, and a clutch associated with said transmission, said clutch and transmission being disposed between the driving and driven members; a speed selecting and changing mechanism operatively connected with the transmission to set the gears in a desired position, shifting means operatively associated with the clutch and adapted to be moved at each actuation of the clutch, a selector mechanism operatively associated with the shifting mechanism and adapted to operate the transmission actuating mechanism incident to movement of the shifting means, a selector manually operated to control the selector mechanism and cause it to move with relation to the shifting means to a set position, means acting automatically to progressively move the shifting means and the transmission actuating means to a final set position while moving the shifting means and actuating means to other set positions in a sequence of operations of the clutch, means acting automatically to return the selector mechanism and the transmission acting mechanism to a previously set position, said automatic action being effected by a subsequent actuation of the clutch, and means associated with the manual selector for rendering said automatic shifting means ineffective.

3. In combination with a driving member, a driven member, a clutch and a variable speed transmission interposed between the driving member and the driven member; a speed selecting and changing mechanism associated with said clutch and transmission and comprising an outer case, longitudinally extending guide means therein, a cross-head carriage slidable upon said guide means, a connection between the cross-head carriage and the clutch mechanism whereby when the clutch is thrown "out" and then returned to its "in" position the cross-head will have been reciprocated through a cycle of its operation, a selector mechanism carried by the cross-head and movable laterally thereof, manually operated selector means for moving said selector mechanism to a desired shifting position, means disposed in the path of travel of the carriage and the selector means and operatively associated with the transmission whereby the transmission will be moved to a position corresponding to the position of the selector means, an escapement means operably associated with the cross-head and the selector means and whereby when the selector is set to produce a final transmission position the selector mechanism will be progressively moved through intermediate transmission positions upon consecutive cycles of operation of the cross-head as effected by the control of the clutch, and means acting automatically to alternately shift the selector mechanism from one position to another and return upon successive cycles of movement of the cross-head.

4. In combination with a driving member, a driven member, a clutch and a variable speed transmission interposed between the driving member and the driven member; a speed selecting and changing mechanism associated with said clutch and transmission and comprising an outer case, longitudinally extending guide means therein, a cross-head carriage slidable upon said guide means, a connection between the cross-head carriage and the clutch mechanism whereby when the clutch is thrown "out" and then returned to its "in" position the cross-head will have been reciprocated through a cycle of its operation, a selector mechanism carried by the cross-head and movable laterally thereof, manually operated selector means for moving said selector mechanism to a desired shifting position, means disposed in the path of travel of the carriage and the selector means and operatively associated with the transmission whereby the transmission will be moved to a position corresponding to the position of the selector means, an escapement means operably associated with the cross-head and the selector means and whereby when the selector is set to produce a final transmission position the selector mechanism will be progressively moved through intermediate transmission positions upon consecutive cycles of operation of the cross-head as effected by the control of the clutch, means acting automatically to alternately shift the selector mechanism from one position to another and return upon successive cycles of movement of the cross-head, and means for rendering said automatic action ineffective adapted to be controlled by the aforesaid manually operable selector means.

JOSEPH J. SZEPE.